United States Patent
Hu et al.

(10) Patent No.: US 10,366,478 B2
(45) Date of Patent: Jul. 30, 2019

(54) METHOD AND DEVICE FOR OBTAINING A HDR IMAGE BY GRAPH SIGNAL PROCESSING

(71) Applicant: THOMSON LICENSING, Issy les Moulineaux (FR)

(72) Inventors: Wei Hu, Rennes (FR); Erik Reinhard, Hédé-Bazouges (FR); Mozhdeh Seifi, Thorigne-Fouillard (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/588,647

(22) Filed: May 7, 2017

(65) Prior Publication Data

US 2017/0337667 A1   Nov. 23, 2017

(30) Foreign Application Priority Data

May 18, 2016   (EP) .................................... 16305573

(51) Int. Cl.
*G06T 5/00*   (2006.01)
*G06T 7/00*   (2017.01)
(Continued)

(52) U.S. Cl.
CPC ............ *G06T 5/007* (2013.01); *G06T 5/50* (2013.01); *G06T 7/97* (2017.01); *H04N 5/2355* (2013.01); *G06T 2207/20021* (2013.01)

(58) Field of Classification Search
USPC ........... 345/582, 589; 348/223.1, 231.6, 335, 348/599; 382/162, 164, 167, 180, 284
See application file for complete search history.

(56) References Cited

U.S. PATENT DOCUMENTS 5,828,793 A * 10/1998 Mann ...................... G06T 5/007
                                              382/284
8,228,417 B1 * 7/2012 Georgiev ............... G03B 11/00
                                              348/335

(Continued)

OTHER PUBLICATIONS

Shuman et al., "The Emerging Field of Signal Processing on Graphs", IEEE Signal Processing Magazine, vol. 30, No. 3, May 2013, pp. 83-98.

(Continued)

*Primary Examiner* — Xuemei G Chen
(74) *Attorney, Agent, or Firm* — Brian J. Dorini; Patricia A. Verlangieri

(57) ABSTRACT

A method of obtaining one or more HDR images representative of a scene is described. To reach that aim, the method includes obtaining several LDR images representative of the scene. The method further includes identifying one or more first pixels having a pixel value that is greater than a first determined value (i.e. corresponding to underexposed pixels) or having a pixel value that is less than a second determined value (i.e. corresponding to overexposed pixels). The method further includes determining one second pixel, in one or more other LDR images, that corresponds to the first pixel. In a block of pixels centered on the second pixel, weighting values are determined that are representative of similarity between the second pixel and the other pixels of the block. A HDR image is finally obtained by determining and assigning a new pixel value to the first pixel. The new value is calculated based on weighting values and pixel values associated with pixels of a block of pixels centered on the first pixel.

13 Claims, 7 Drawing Sheets

(51) Int. Cl.
  *G06T 5/50* (2006.01)
  *H04N 5/235* (2006.01)

(56) References Cited

U.S. PATENT DOCUMENTS

| | | | |
|---|---|---|---|
| 8,471,920 B2 | 6/2013 | Georgiev et al. | |
| 8,483,479 B2* | 7/2013 | Kunkel | G06T 5/009 |
| | | | 382/162 |
| 8,947,555 B2* | 2/2015 | Velarde | H04N 5/2355 |
| | | | 348/223.1 |
| 9,071,765 B2 | 6/2015 | Motta | |
| 9,305,372 B2 | 4/2016 | Li et al. | |
| 9,628,721 B2* | 4/2017 | Moon | H04N 5/2355 |
| 9,712,753 B2* | 7/2017 | Mine | H04N 5/2351 |
| 10,032,261 B2* | 7/2018 | Reinhard | G06T 5/008 |
| 2003/0117412 A1 | 6/2003 | Brooksby et al. | |
| 2003/0128893 A1* | 7/2003 | Castorina | G06T 5/50 |
| | | | 382/284 |
| 2006/0159343 A1* | 7/2006 | Grady | G06T 7/11 |
| | | | 382/180 |
| 2007/0296730 A1* | 12/2007 | Lefebvre | G06T 11/001 |
| | | | 345/582 |
| 2011/0032392 A1* | 2/2011 | Litvinov | G06T 3/4015 |
| | | | 348/241 |
| 2013/0114894 A1* | 5/2013 | Yadav | G06T 5/008 |
| | | | 382/167 |
| 2014/0152686 A1* | 6/2014 | Narasimha | G09G 5/377 |
| | | | 345/589 |
| 2015/0002704 A1* | 1/2015 | Vidal-Naquet | H04N 5/2355 |
| | | | 348/241 |
| 2015/0043811 A1* | 2/2015 | Prabhudesai | G06T 5/008 |
| | | | 382/164 |
| 2015/0049215 A1* | 2/2015 | Kuang | H04N 5/2355 |
| | | | 348/231.6 |
| 2015/0055018 A1* | 2/2015 | Matsuda | H04N 5/142 |
| | | | 348/599 |
| 2015/0161797 A1 | 6/2015 | Park et al. | |
| 2015/0256734 A1 | 9/2015 | Fukuhara | |
| 2016/0212355 A1* | 7/2016 | Pouli | G06T 5/50 |
| 2016/0292888 A1* | 10/2016 | Arita | G01B 11/24 |
| 2017/0103497 A1* | 4/2017 | Cao | G06T 3/4015 |
| 2017/0180694 A1* | 6/2017 | Stauder | H04N 19/179 |

OTHER PUBLICATIONS

Li et al., "High Dynamic Range and All-focus Image from Light Field", 2015 IEEE International Conference Cybernetics and Intelligent Systems, Siem Reap, Cambodia, Jul. 15, 2015, pp. 7-12.
Bonnard et al., "High-dynamic range video acquisition with a multiview camera", SPIE Conference on Optics, Photonics, and Digital Technologies for Multimedia Applications II, Brussels, Belgium, Apr. 16, 2012, pp. 1-11.
Li et al., "Image Demosaicing: A Systematic Survey", Visual Communications and Image Processing, SPIE Proceedings, vol. 6822, Jan. 28, 2008, pp. 1-15.
Manakov et al., "A Reconfigurable Camera Add-On for High Dynamic Range, Multispectral, Polarization, and Light-Field Imaging", ACM Transactions on Graphics, SIGGRAPH 2013, vol. 32, No. 4, Article No. 47, Jul. 2013, pp. 1-12.
Tursun et al., "The State of the Art in HDR Deghosting: A Survey and Evaluation", Eurographics 2015 European Association for Computer Graphics, Zurich, Switzerland, May 4, 2015, pp. 1-25.
Abebe et al., "Color Clipping and Over-exposure Correction", Eurographics Symposium on Rendering—Experimental Ideas & Implementations, Darmstadt, Germany, Jun. 24, 2015, pp. 1-12.
Chung, "Spectral Graph Theory", American Mathematical Society, Providence, Rhode Island, 1997, pp. 1-2. Preface.
Fiss et al., "Refocusing Plenoptic Images using Depth-Adaptive Splatting", 2014 IEEE International Conference on Computational Photography, Santa Clara, California, USA, May 2, 2014, pp. 1-9.
Georgiev et al., "High Dynamic Range Image Capture with Plenoptic 2.0 Camera", Signal Recovery and Synthesis 2009, San Jose, California, USA, Oct. 13, 2009, pp. 1-3.
Jeon et al., "Accurate Depth Map Estimation from a Lenslet Light Field Camera", 28th IEEE Conference on Computer Vision and Pattern Recognition, Boston, Massachusetts, USA, Jun. 7, 2015, pp. 1547-1555.
Horstmeyer et al., "Flexible Multimodal Camera Using a Light Field Architecture", IEEE International Conference on Computational Photography, San Francisco, California, USA, Apr. 16, 2009, pp. 1-8.
Ng et al., "Light Field Photography with a Hand-Held Plenoptic Camera", Stanford Computer Science Technical Report CSTR, vol. 2, No. 11, 2005, pp. 1-11.
Reinhard et al., "High Dynamic Range Imaging: Acquisition, Display, and Image-Based Lighting", Elsevier Inc., Amsterdam, 2010, pp. 1-135.
Schechner et al., "Generalized Mosaicing: High Dynamic Range in a Wide Field of View", International Journal of Computer Vision, vol. 53, No. 3, 2003, pp. 245-267.
Uyttendaele et al., "Eliminating Ghosting and Exposure Artifacts in Image Mosaics", 2001 IEEE Conference on Computer Vision and Pattern Recognition, Kauai, Hawaii, USA, Dec. 8, 2001, pp. 509-516.
Von Luxburg, "A Tutorial on Spectral Clustering", Statistics and Computing, vol. 17, No. 4, Nov. 1, 2007, pp. 395-416.
Sabater et al., "Accurate Disparity Estimation for Plenoptic Images", 13th European Conference on Computer Vision, Zurich, Switzerland, Sep. 6, 2014, pp. 548-560.

* cited by examiner

| | | | |
|---|---|---|---|
| 400 | 401 | 402 | 403 |
| 410 | 411 | 412 | 413 |
| 420 | 421 | 422 | 423 |
| 430 | 431 | 432 | 433 |

METHOD AND DEVICE FOR OBTAINING A HDR IMAGE BY GRAPH SIGNAL PROCESSING

1. REFERENCE TO RELATED EUROPEAN APPLICATION

This application claims priority from European No. 16305573.4, entitled "METHOD AND DEVICE FOR OBTAINING A HDR IMAGE BY GRAPH SIGNAL PROCESSING," filed on May 18, 2016, the contents of which are hereby incorporated by reference in its entirety.

2. TECHNICAL FIELD

The present disclosure generally relates to image processing for obtaining high dynamic range images.

3. BACKGROUND ART

This section is intended to introduce the reader to various aspects of art, which may be related to various aspects of the present disclosure that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Sensors in digital cameras have a limited dynamic range that makes it difficult to capture all the details in scenes with difficult illumination. Therefore, when taking a photo, the user is faced with the choice of either rendering details in shadow areas and overexposing the highlights, or exposing for highlights but losing details in darker zones. In order to overcome this issue, HDR (which stands for "High-Dynamic-Range") imaging techniques can be used, which aim to reproduce a greater dynamic range of luminosity than possible using standard digital imaging or photographic (i.e. classical sensors in the sense that these sensors have a limited dynamic range). In order to achieve this result, one technique relies on capturing multiple images of the same scene but at different exposures. Such technique is called a bracketing technique. The bracketing technique aims at generating two or more different LDR (which stands for "Low-Dynamic-Range") images that are then aligned and combined to obtain a HDR image.

However, artifacts such as ghosting artifacts may occur in the HDR image(s) if the image sequence is inappropriately registered, which is especially challenging for hand-held conventional cameras due to camera movement. Further, ghosting artifacts may occur due to object movement during the capture of the image sequence.

4. SUMMARY

References in the specification to "one embodiment", "an embodiment", "an example embodiment", "a particular embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure relates to a method of obtaining a first image having a first dynamic range (e.g. a high dynamic range image) and representative of a scene, the method comprising:
  obtaining a plurality of second images having a second dynamic range that is lower than the first dynamic range (e.g. low dynamic range images) and representative of the scene;
  for a first low dynamic range image of the plurality of low dynamic range images, identifying at least one first pixel of a first block of pixels (e.g. centered on the first block of pixels) and having a first pixel value greater than a first value or less than a second value;
  retrieving a second pixel in a second low dynamic range image of the plurality of low dynamic range images corresponding to the at least one first pixel, the second low dynamic range image being different from the first low dynamic range image;
  in a second block of pixels comprising the second pixel (e.g. a second block of pixels centered on the second pixel), determining weighting values representative of similarity between the second pixel and the other pixels of the second block;
  obtaining the high dynamic range image by assigning a second pixel value to the at least one first pixel, the second value being obtained from the weighting values and first values associated with pixels of the first block of pixels.

According to a characteristic, the weighting values are obtained by comparing pixel values of pixels of the second block, a weighting value being associated with an edge linking two pixels of the second block.

According to a particular characteristic, the second value is obtained by:
  selecting within the first block at least one pixel having an associated first value being in a range between the first value and the second value, the at least one pixel being adjacent to the at least one first pixel within the first block;
  weighting the first value of the at least one selected pixel with the weighting value associated with the edge linking the at least one pixel of the second block corresponding to the at least one selected pixel of the first block with the second pixel.

According to a specific characteristic, the second pixel is retrieved by:
  comparing the first block with a plurality of blocks of pixels in the plurality of low dynamic range images different from the at least one first low dynamic range image;
  selecting the second block of pixels among the plurality of blocks of pixels compared with the first block, the selected second block of pixels being the block of pixels having a smallest distance from the first block;
  retrieving the second pixel from the selected second block.

According to another characteristic, the plurality of low dynamic range images is obtained from lightfield data obtained with a plenoptic camera.

The present disclosure relates to an apparatus configured and/or adapted to perform the method of obtaining a high dynamic range image representative of a scene, the apparatus comprising a memory associated with at least one processor configured to perform the operations of the method.

The present disclosure also relates to a computer program product comprising instructions of program code for executing steps of the method of obtaining a high dynamic range image representative of a scene, when the program is executed on a computing device.

The present disclosure also relates to a processor readable medium having stored therein instructions for causing a processor to perform at least a step of the method of obtaining a high dynamic range image representative of a scene.

The present disclosure also related to a communication/multimedia terminal comprising a lightfield camera and/or a processing unit configured to implement the method of obtaining a high dynamic range image representative of a scene.

5. LIST OF FIGURES

The present disclosure will be better understood, and other specific features and advantages will emerge upon reading the following description, the description making reference to the annexed drawings wherein.

6. DETAILED DESCRIPTION OF EMBODIMENTS

Figure 1:
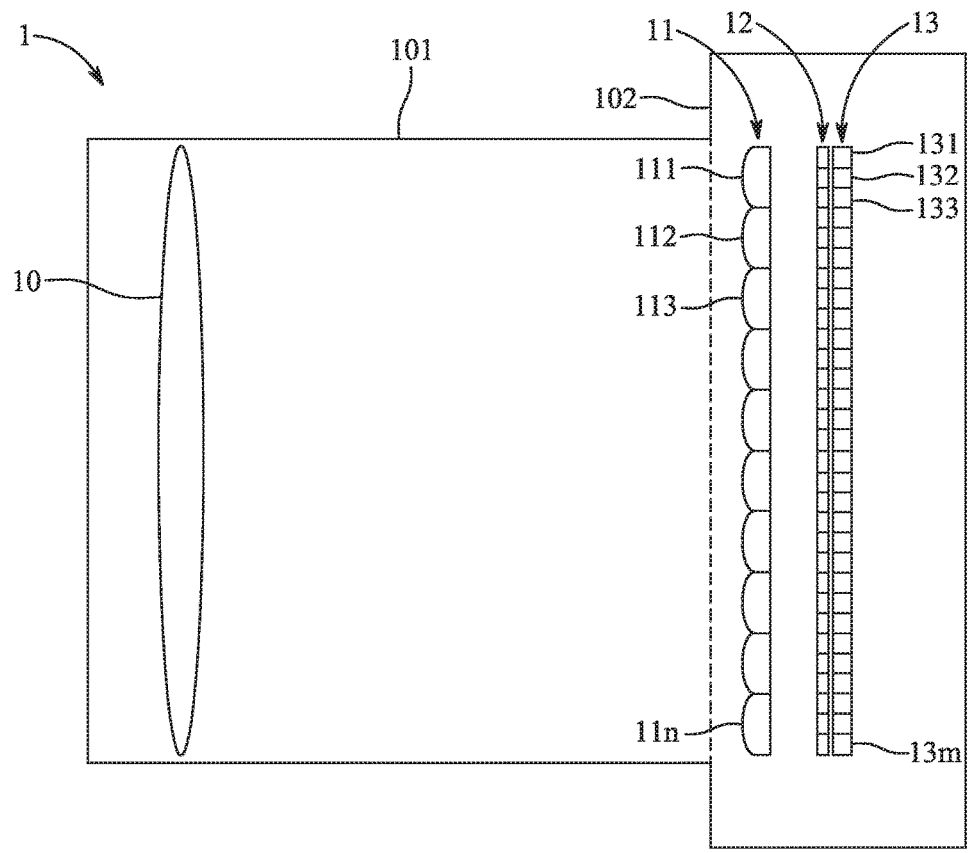
FIG. 1 is a block diagram illustration of a lightfield camera, according to one embodiment of the present principles.

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details.

In the following, an image (also called a frame or a picture) contains one or several arrays of samples (pixel values) in a specific image/video format which specifies all information relative to the pixel values of an image (or a video) and all information which may be used by a display and/or any other device to visualize and/or decode an image (or video) for example. An image comprises at least one component, in the form of a first array of samples, usually a luma (or luminance) component, and, possibly, at least one other component, in the form of at least one other array of samples, usually a color component. Or, equivalently, the same information may also be represented by a set of arrays of color samples, such as the traditional tri-chromatic RGB (Red, Green, and Blue) representation.

A pixel value is represented by a vector of C values, where C is the number of components. Each value of a vector is represented with a number of bits which defines a maximal dynamic range of the pixel values.

A block of an image means a set of pixels which belong to this image and the pixel values of a block means the values of the pixels which belong to this block.

Low-Dynamic-Range images (LDR images) are images whose component values are represented with a limited number of bits (most often 8 or 10 per component). This limited representation does not allow correct rendering of small signal variations, in particular in dark and bright luminance ranges. In high-dynamic range images (HDR images), the signal representation is extended in order to maintain a high accuracy of the signal over its entire range. In HDR images, pixel values are usually represented in floating-point format (either 32-bit or 16-bit for each component, namely float or half-float), one exemplary format being openEXR half-float format (16-bit per RGB component, i.e. 48 bits per pixel) or in integers with a long representation, typically at least 16 bits.

The present principles will be described in reference to a particular embodiment of a method of obtaining one or more HDR images representative of a scene. To reach that aim, the method comprises obtaining (e.g. acquiring or receiving, for example from a remote storage device or from a local memory) several LDR images representative of said scene. The set of LDR images may be for example obtained from lightfield data (e.g. acquired with a plenoptic camera or with a camera array) or from a multi-exposure stack of images, i.e. a sequence of images acquired for example with a digital camera (e.g. a DSLR (for Digital Single-lens Reflex) camera) at different exposure times. According to another example, the set of LDR images may be obtained by various ISO sensitivity, by adding different neutral density filters between shots, or by changing the aperture between shots. The method further comprises the identifying of one or more first pixels having a pixel value that is greater than a first value (i.e. corresponding to over-exposed pixels) or having a pixel value that is less than a second value (i.e. corresponding to under-exposed pixels). The first pixels may also be called badly exposed pixels, the first pixels being for example identified in one of the LDR images, in several LDR images or in the whole set of LDR images. The method further comprises the determining of one second pixel in one or more LDR images (different from the LDR image(s) comprising the identified first pixel(s)) that corresponds to the first pixel, i.e. the first pixel and the second pixels corresponding to the first pixel refer to the same point in the scene. In a block of pixels centred on said second pixel, weighting values are determined that are representative of similarity between said second pixel and the other pixels of the block. A HDR image is finally obtained by determining and assigning a new pixel value to the first pixel. The new value is calculated based on weighting values and pixel values associated with pixels of a block of pixels centred on the first pixel.

FIG. 1 is a block diagram depiction of an exemplary lightfield acquisition device according to one embodiment. FIG. 1 illustrates a plenoptic camera 1, having a lens unit 101 (corresponding to an optical assembly) and a camera body 102. The lens unit 101 comprises a camera lens 10, also called a main lens or primary lens, which is advantageously formed of one or more lens elements, only one lens element 10 being depicted in FIG. 1 for clarity purpose.

The lens unit 101 may be adapted to be associated with the camera body 102. The camera body 102 comprises a photosensor array 13, which includes a plurality of m photosensors 131, 132, 133 to 13m. Each photosensor corresponds to a pixel of the raw image of the scene acquired with the photosensor array, with each pixel encompassing a part (also called a point) of the scene. Data representative of the scene obtained with each photosensor form a set of lightfield data, the lightfield data ultimately forming a lightfield image. Before processing of the raw image (before demultiplexing and/or demosaicing as explained below in regard to FIG. 4), the lightfield image may also correspond to the raw image as per one embodiment. In this embodiment, after demultiplexing of the raw image, the lightfield image may then be provided such that it corresponds to sub-aperture images. After demosaicing, the lightfield image will correspond to a set of views of the scene accordingly. For purposes of illustration, the photosensor array 13 as shown only provides a relatively small number of photosensors 131 to 13m However, in alternate embodiments the number of photosensors of FIG. 1 can be varied and either increased or decreased. For example, in an alternate embodiment, several thousand or several millions of photosensors can be utilized. In another example, in a 12.4 megapixel camera, a pixel can be provided such that it will correspond to each photosensor (e.g. corresponding to an array of 4088×3040 pixels/photosensors). In one embodiment, a color filter array (CFA) 12 can be used in conjunction with the photosensor array 13. The CFA 12 typically provides for RGB (Red, Green and Blue) color filters on the photosensor array, the RGB arrangement taking for example the form of a Bayer filter mosaic. According to an alternate embodiment, a CFA is arranged on the lenslet array 11 (in addition to the CFA 12 or in replacement of the CFA 12). For associating the lens unit 101 with the camera body 102, the lens unit 101 comprises a first attaching part and the camera body 102 comprises a second attaching part, the first and second attaching parts being compatible with each other. The first and second attaching parts enable coupling the lens unit 101 and the camera body 102 together, e.g., by clipping them together or by screwing the lens unit into the camera body. According to a different embodiment, the lens unit 101 and the camera body 102 collectively form one single body and are assembled without being detachable.

The first and second attaching parts are configured in such a way that, once the lens unit 101 and the camera body 102 have been put together, the lens unit 101 and the camera body 102 form a plenoptic camera configured for acquiring multiple views of a scene at each acquisition of the scene. To this end, the camera body 102 also comprises a lenslet array 11 comprising n microlenses 111, 112, 113, 11n, n being an integer greater than or equal to 2. The lenslet array 11 is also called microlens array. For purposes of illustration, the lenslet array 11 is shown with a relative small number of microlenses, but the number of microlenses may extend up to several thousand or even one or several million of microlenses. A group of photosensors of the photosensor array 13 are optically associated with each microlens 111 to 11n of the lenslet array 11. For example, each microlens 111 to 11n of the lenslet array 11 is sized to correspond to an array of 2×1, 4×4 or 10×10 photosensors. A group of photosensors associated with a microlens (or said differently, a group of photosensors under the microlens) form a micro-image associated with this microlens, each photosensor of the group of photosensors forming a pixel of the micro-image. Each photosensor of the plurality of photosensors optically associated with one single microlens enables acquiring raw data representative of a pixel of the scene according to one position (acquisition of as many parallaxes as pixels).

The plenoptic camera 1 is equally of the type 1.0, corresponding to a plenoptic camera wherein the distance between the lenslet array 11 and the photosensor array 13 is equal to the microlenses focal length, or of the type 2.0 otherwise (also called focused plenoptic camera).

Figure 2A:
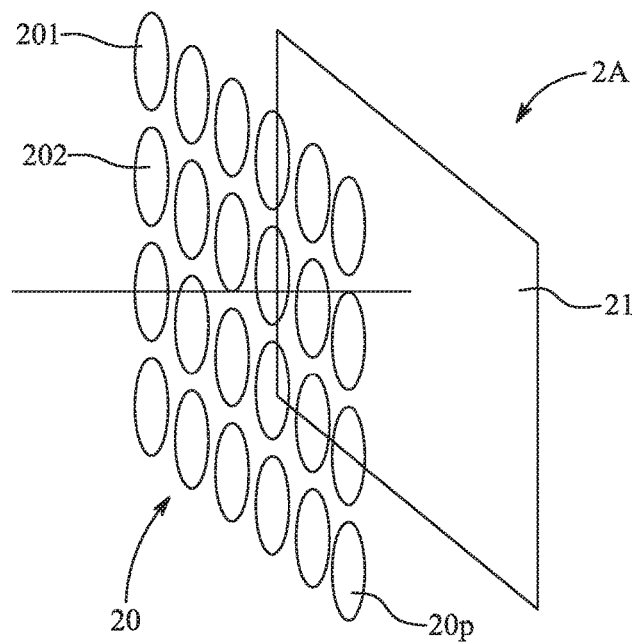
FIG. 2A and FIG. 2B are illustrations of a lightfield camera, according to an embodiment of the present principles.
Figure 2B:
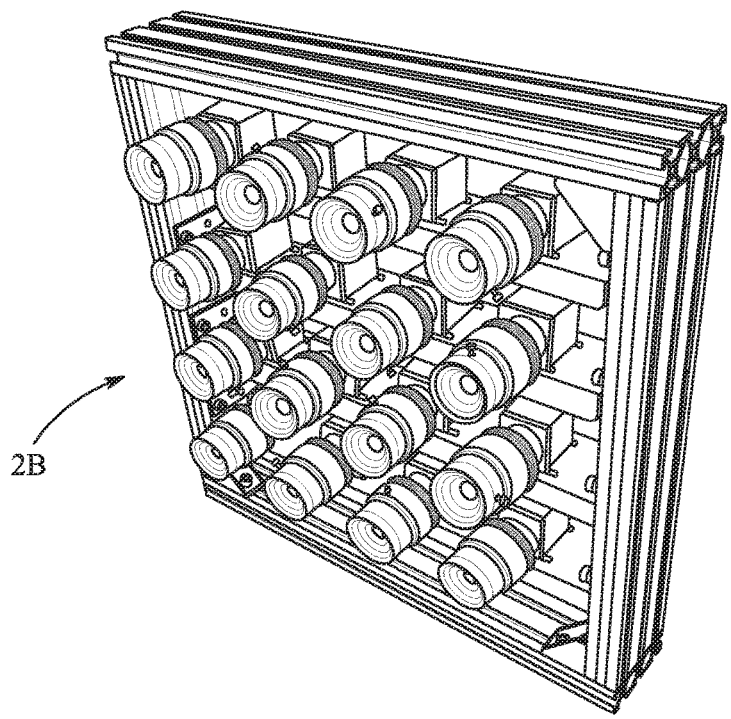

FIGS. 2A and 2B provide other examples of a lightfield acquisition device. More specifically, FIGS. 2A and 2B each show a camera array 2A, 2B (also called multi-camera arrays), according to two particular embodiments of the present principles.

The camera array 2A comprises an array 20 of lenses or micro-lenses comprising several micro-lenses 201, 202 to 20p with p being an integer corresponding to the number of micro-lenses, and one or several sensor arrays 21. The camera array 2A does not include a main lens. The array of lenses 20 may be a small device, which is commonly named a micro-lens array. The camera array with a single sensor can be considered as a special case of plenoptic camera where the main lens has an infinite focal length. According to a particular arrangement wherein the number of photosensors is equal to the number of micro-lenses, i.e. one photosensor is optically associated with one micro-lens, the camera array 20 may be seen as an arrangement of a plurality of individual cameras (for example micro-cameras) closely spaced, such as a square arrangement (as illustrated in FIG. 2A) or a quincunx arrangement for example.

The camera array 2B corresponds to a rig of individual cameras each comprising a lens and a photosensor array. The cameras are spaced apart by, for example, a distance equal to a few centimeters or less or 5, 7 or 10 cm.

The lightfield data (forming a so-called lightfield image) obtained with such a camera array 2A or 2B corresponds to the plurality of views of the scene, i.e. to the final views obtained by demultiplexing and demosaicing of the raw image obtained with a plenoptic camera such as the plenoptic camera of FIG. 1. The cameras of the camera array are calibrated according to any known method, i.e. intrinsic and extrinsic parameters of the cameras are known.

Figures 4, 5:
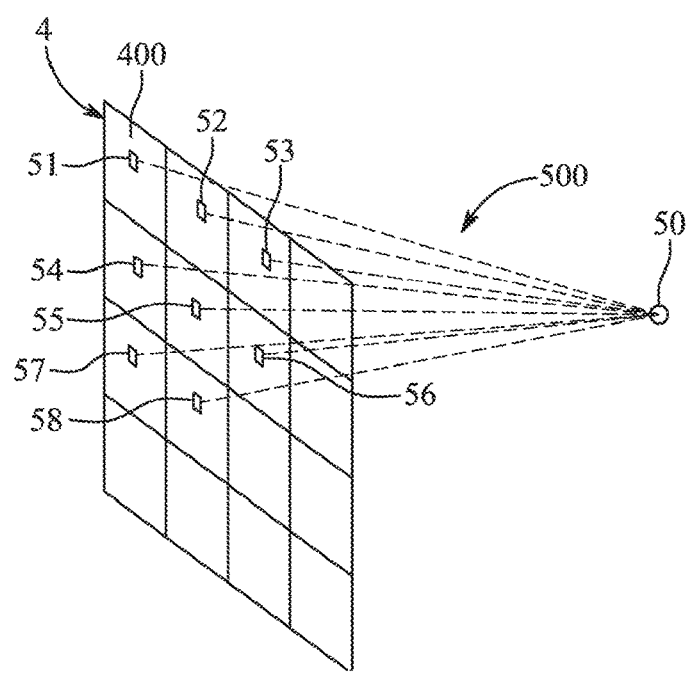
FIG. 4 illustrates a set of low dynamic range images, according to an embodiment of the present principles.
FIG. 5 is an illustration of correspondence between pixels of the LDR images of FIG. 4, according to an embodiment of the present principles.

FIG. 4 shows a first example of a set 4 of LDR images 400 to 403, 410 to 413, 420 to 423 and 430 to 433 obtained either with the lightfield camera 1 or 2 or with any digital camera such as a DSLR camera, according to one embodiment of the present principles.

When obtained with the lightfield camera 1 or 2, the set 4 may be seen as lightfield data that is represented with a collection of views 400 to 403, 410 to 413, 420 to 423 and 430 to 433 that are represented with a matrix 4 of 4 rows and 4 columns, as shown, each view corresponding to a LDR image. The last two digits of each reference number for each image/view indicates the corresponding row and column associated with the view. For example, the view referenced 400 belongs to the first row having as indicia 0 and to the first column having as indicia 0 and the view referenced 421 belongs to the third row having as indicia 2 and to the second column having as indicia 1, the rows being indexed from 0 to 3 and the columns being indexed from 0 to 3.

Each view 400 to 403, 410 to 413, 420 to 423 and 430 to 433 is an image of the scene according to a particular point of view, each view being associated with a different point of view. Each view comprises a plurality of pixels, for example N rows×M columns of pixels (also called elements), each pixel/element having component value(s) (e.g. color information associated with, for example RGB color information or CMY (Cyan, Magenta, and Yellow) color information).

The views are, for example, obtained directly from the lightfield camera 2, one view being acquired directly through one lens of the array of lenses 20 or by processing the raw image acquired with the lightfield camera 1, i.e. by demultiplexing (as described in the article entitled "*Accurate Depth Map Estimation from a Lenslet Light Field Camera*" by Hae-Gon Jeon Jaesik Park Gyeongmin Choe Jinsun Park, Yunsu Bok Yu-Wing Tai In So Kweon) and demosaicing (as described in "*Image demosaicing: a systematic survey*" by Li, Gunturk and Zhang, *Proc. SPIE*, vol. 6822, p. 68221) (2008)) the raw image. The demosaicing enables to recover a full color raw image, i.e. to recover full color information (for example RGB information) for the pixels of the raw image while the raw image acquired with the plenoptic image associates only one component value (R, G or B for example) with each pixel. The demultiplexing comprises reorganizing the pixels of the raw image in such a way that all pixels capturing the light rays with a certain angle of incidence are stored in the same image creating the so-called sub-aperture images. Each sub-aperture image is a projection of the scene under a different angle. The set of sub-aperture images creates a block matrix where the central image stores the pixels capturing the light rays perpendicular to the photosensor array.

The number of LDR images/views are not limited to 16 as shown in FIG. 4 but in alternate embodiments can extend to any integer accordingly such as 4 LDR images/views, 10 LDR images/views, 100 LDR images/views or n LDR images/views. The arrangement of the views is not limited to a rectangular matrix arrangement either and can be of any geometrical shape such as a circular matrix arrangement, a quincunx matrix arrangement or others.

The lightfield data comprises a plurality of elements (or pixels), with each element being represented with a 4-dimensional coordinate, (i.e. two coordinates to identify the view the element belongs to and two other coordinates provided to identify the location of the element within the view it represents). For example, an element 'i' of the lightfield data is represented by the 4 coordinates $(s_i, t_i, x_i, y_i)$. $s_i$ and $t_i$ correspond to the indices of the view the element 'i' belongs to (e.g. $s_i$ corresponds to the row indicia of the view and $t_i$ to the column indicia of the view in the matrix of views). $x_i$ and $y_i$ correspond for example to the row indicia and column indicia of the element 'i' within the view $(s_i, t_i)$, $0 \leq x \leq N-1$ and $0 \leq y \leq M-1$.

When obtained with a "classical" digital camera such as a DSLR camera, each LDR image of the set 4 is representative of the scene but acquired at different times (e.g. the image 400 is acquired at time t, the image 401 at time t+1, the image 402 at time t+2 and so on), each LDR image being acquired with a different exposure time (e.g. dt for the image 400, 2×dt for the image 401, 4×dt for the image 402, the exposure time doubling for each successive frame) to obtain a multi-exposure stack of LDR images.

FIG. 5 shows a set of corresponding pixels in the set 4 of LDR images 400 to 403, 410 to 413, 420 to 423 and 430 to 433, according to one embodiment. FIG. 5 shows a group of rays 500 (also called a ray bundle), the origin of each ray of the group 500 being a same 3D point 50 of the scene, each ray being associated with a pixel 51 to 58 of the set of LDR images (at most one pixel in each LDR image). The pixels 51, 52, 53, 54, 55, 56, 57 and 58 are included in the LDR images 400, 401, 402, 410, 411, 412, 420 and 421 respectively. The pixels 51 to 58 are called corresponding pixels as they all refer to the same point 50 of the scene.

Figure 3:
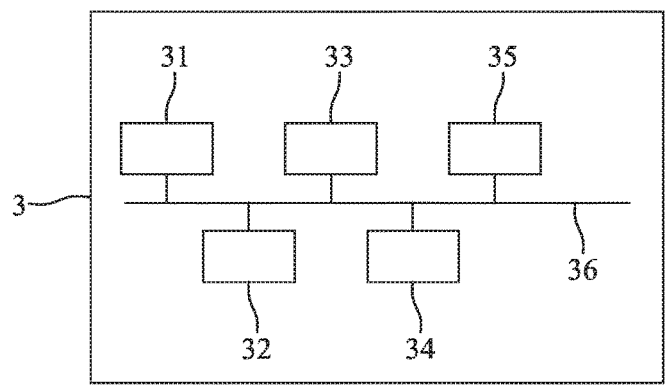
FIG. 3 is an illustration of an embodiment depicting a processing unit configured to process data of low dynamic range images, according to an embodiment of the present principles.

FIG. 3 shows a schematic block diagram illustrating an example of an apparatus 3 for processing the set 4 of LDR images. The data representative of the LDR images (e.g. pixel values) are for example received from the lightfield acquisition device of FIG. 1 or 2A, 2B or from any acquisition device. According to another example, the data representative of the LDR images are received from a storage device onto which the data are stored.

The apparatus 3 comprises a processor 31, a storage unit 32, an input device 33, a display device 34, and an interface unit 35 which are connected by a bus 36. Of course, constituent elements of the apparatus 3 may be connected by a connection other than a bus connection using the bus 36.

The processor 31 controls operations of the apparatus 3. The storage unit 32 stores at least one program to be executed by the processor 31, and various data, including data of the LDR images, parameters used by computations performed by the processor 31, intermediate data of computations performed by the processor 31, and so on. The processor 31 may be formed by any known and suitable hardware, or software, or a combination of hardware and software. For example, the processor 31 may be formed by dedicated hardware such as a processing circuit, or by a programmable processing unit such as a CPU (Central Processing Unit) and/or GPUs (Graphical Processing Unit) that executes a program stored in a memory thereof.

The storage unit 32 may be formed by any suitable storage or means capable of storing the program, data, or the like in a computer-readable manner. Examples of the storage unit 32 include non-transitory computer-readable storage media such as semiconductor memory devices, and magnetic, optical, or magneto-optical recording media loaded into a read and write unit. The program causes the processor 31 to perform processes for processing the light field data, according to embodiments of the present disclosure as described hereinafter with reference to FIGS. 8 and 9.

The input device 33 may be formed by a keyboard, a pointing device such as a mouse, or the like for use by the user to input commands, to make user's selections of objects of interest within the scene. The output device 34 may be a display device to display, for example, a Graphical User Interface (GUI), HDR images, or a depth map image. The input device 33 and the output device 34 may be combined into a single device, e.g., a touchscreen panel.

The interface unit 35 provides an interface between the apparatus 3 and an external apparatus. The interface unit 35 may communicate with the external apparatus via wired or wireless communication. In one exemplary embodiment, the external apparatus may be a light field acquisition device, e.g. a light field camera. In this case, data of 4D light field images captured by the light field acquisition device can be input from the light field acquisition device to the apparatus 3 through the interface unit 35, then stored in the storage unit 32.

In an exemplary embodiment the apparatus 3 may be separate from the acquisition device and communicate with each other via either wired or wireless communication. In another embodiment, the apparatus 3 may be integrated with a light field acquisition device.

Although only one processor 31 is shown in FIG. 3, it must be understood that such a processor may comprise different modules and units embodying the functions carried out by apparatus 3 according to embodiments of the present disclosure, such as the following which are explained further below:

- a module for receiving the LDR images;
- a module for identifying first pixels in one or more LDR images (called first LDR images);
- a module for retrieving second pixels corresponding to the identified first pixels in other LDR images (called second LDR images) different from the first LDR image(s);
- a module for determining the weighting values in the block(s) of pixels each centred at a second pixel;
- a computing unit for computing the new pixel value to be assigned to the identified first pixel.

In various alternative embodiments, the modules and units can be embodied in several processors 31 accordingly that communicate and co-operate with each other.

Figure 6:
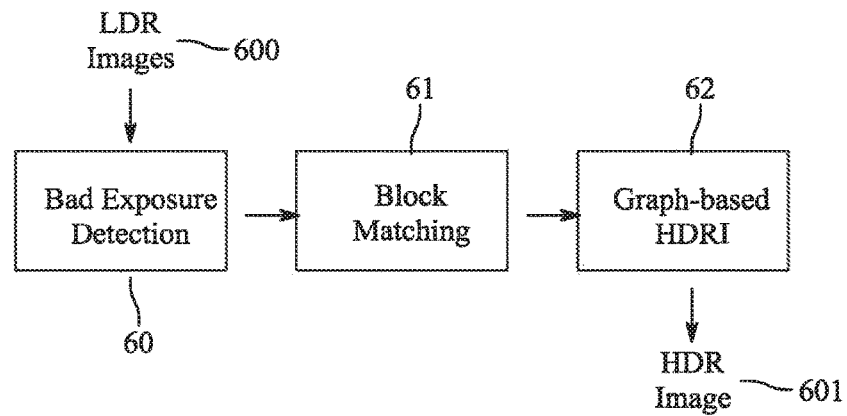
FIG. 6 shows a process for obtaining a HDR image from the LDR images of FIG. 4, according to an embodiment of the present principles.

FIG. 6 shows a process for obtaining a HDR image from a set of LDR images, according to a specific and non-limiting exemplary embodiment of the present principles.

The set of LDR images 600 is received from a memory device or directly from an acquisition device, such as a light field acquisition device or a conventional acquisition device. The set of LDR images 600 may for example correspond to the set 4 of LDR images.

In an operation 60, badly exposed pixels (i.e. under-exposed pixels and/or over-exposed pixels) are identified in one or more LDR images of the set of LDR images. In the rest of the following description of the process, the description will focus on the operations performed on one identified pixel, called first pixel. This first pixel belongs to one of the LDR images, called first LDR image. Naturally, the same operations may be performed as well for several first pixels or for all identified first pixels. A first pixel (i.e., either over-exposed or under-exposed) of the first LDR image may be detected by thresholding: if the pixel value of a pixel of the LDR images is higher than a first value $\tau_o$ (e.g., 0.9 or 0.95), then the considered pixel is detected as being a first pixel (i.e., an over-exposed pixel); if the pixel value is lower than a second value $\tau_u$ (e.g., 0.05 or 0.1), then the considered pixel is detected as being a first pixel (i.e. an under-exposed pixel). The first and second values are set in such a way to account for noise.

In an operation 61, one or more second pixels corresponding to the identified pixels are retrieved from one or more LDR images, called second LDR image(s) by block matching as explained below, the second LDR image(s) being different from the first LDR image. Well-exposed pixels may be leveraged to reconstruct the corresponding first pixel that images the 3D points in the scene. The obtaining of second pixels corresponding to the first pixel (or each first pixel) may be achieved by block matching, a technique that is based on the principle that two pixels are similar (i.e., 'match'), if their immediate neighborhoods match. A block of pixels may be constructed around the first pixel in the first LDR image, and search for matching blocks in second LDR images may be performed, with the aim to find blocks where the center pixel is not badly exposed, i.e. is not a first pixel. The assumption is that when two blocks are matched, then their central pixels image the same point in the scene, making the well-exposed pixels in the matched blocks good candidates to reconstruct the first pixel. The use of blocks makes the technique robust in the presence of noise.

Specifically, block matching is performed as follows: for a first pixel p in the first LDR image, also called target image, $v_t$ (the index 't' here refers to "target"), an l×l (e.g., l=9, 13 or 15) block $B_t^p$ centered at p is formed. Then the matched block in the kth LDR image $\tilde{B}_k^p$ is searched among a set of candidate blocks. Candidate blocks are formed by shifting the location of $B_t^p$ in the kth view within a search range [−r, r] (e.g., r=2), horizontally, vertically and diagonally. The search range is set according to the prior knowledge that the disparity between corresponding pixels in a lightfield (e.g. plenoptic) camera is small in general. The Euclidean distance between the target block $B_t^p$ and each candidate block is then computed, and the candidate block with the smallest Euclidean distance from $B_t^p$ is selected as the matched block. The center of the matched block is the corresponding second pixel of the first pixel p.

Figure 7:
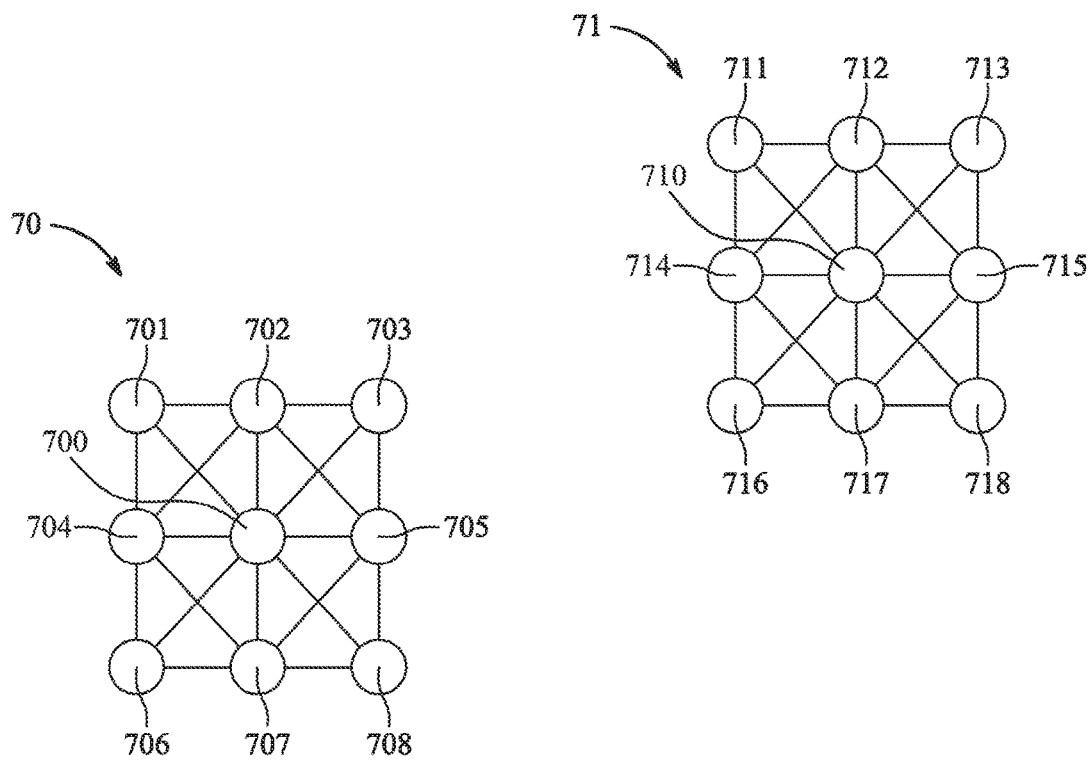
FIG. 7 shows blocks of pixels of two LDR images of the FIG. 4, according to an embodiment of the present principles.

A first block of pixels and a second block of pixels are for example illustrated on FIG. 7. The first block of pixels 70 comprises 8 pixels 701 to 708 surrounding the first pixel 700, meaning that the first block of pixels 70 is centred at the first pixel 700, which is a badly exposed pixel identified in a target LDR image, i.e. the first LDR image. The first block of pixels 70 is comprised within the first LDR image, which may correspond for example to a central view of a matrix of views obtained with light field data obtained with the light field camera 1 or 2.

The second block of pixels 71 comprises the same number of pixels as the first block of pixels 70. The second block of pixels 71 comprises 8 pixels 711 to 718 surrounding a second pixel 710 that best corresponds to the first pixel. The second block of pixels 71 is centred at the second pixel 710, which is a well-exposed pixel (with a pixel value comprised in the range of values between the first determined value and the second determined value). The second block of pixels is comprised within a second LDR image, which is different from the first LDR image, both first and second LDR images belonging to the set 600 of LDR images representative of the same scene.

In an operation 62, a graph-based technique is performed to obtain the HDR image 601. A weighted graph G={V,E} comprises a finite set of vertices V with cardinality |V|=m and a set of edges E connecting vertices. A weighted adjacency matrix W may be adopted to describe the graph connectivities. Specifically, W is a real m×m matrix, where $w_{i,j}$ is the weight assigned to the edge connecting vertices i and j. Undirected graphs correspond to symmetric weighted adjacency matrices, i.e., $w_{i,j}=w_{j,i}$. The weights are assumed to be non-negative, i.e., $w_{i,j} \geq 0$.

The unnormalized combinatorial graph Laplacian is defined as L:=D−W, where D is the degree matrix—a diagonal matrix where the ith diagonal element is the sum of all elements in the ith row of W, i.e., $d_{i,i}=\Sigma_{j=1}^{m} w_{i,j}$.

Graphs provide generic data representations that are useful for describing geometric structures of the data, such as social, sensor and neural networks. The weight associated with each edge in the graph often represents the similarity between the two vertices it connects. According to the present principles, each pixel in a LDR image is treated as a vertex in a graph, and each edge describes the value similarity between the pixels it connects, as illustrated with regard to FIG. 7, wherein the pixels in the first and second blocks 70 and 71 are linked with edges (illustrated with straight lines between the pixels), a weight value being associated with each edge, the weight value being representative of the similarity of the pixels linked by the considered edge. In FIG. 7, a first graph (8-connectivity graph) corresponds to the first block 70 of pixels and a second graph (8-connectivity graph) corresponds to the second block 71 of pixels. A collection of these pixel values is referred to as a graph signal, as shown on FIG. 8 that is discussed hereinbelow.

For any signal $x \in \mathbb{R}^m$ residing on the vertices of a graph represented by a graph Laplacian L, a graph smoothness prior x'Lx can be leveraged to represent the smoothness of the signal with respect to the graph. This is because:

$$x'Lx = \Sigma_{i \sim j} w_{i,j}(x_i - x_j)^2, \qquad (6)$$

where i~j denotes a pair of vertices i and j connected by an edge in the graph. The quantity x'Lx is small when x has similar values at each pair of connected vertices i and j even with a large weight $w_{i,j}$, or when the weight $w_{i,j}$ is small for an edge connecting i and j with dissimilar values. Hence, a signal is smooth with respect to a graph, i.e., x'Lx is small, if and only if the graph weights capture the underlying structure of the signal well.

The graph smoothness prior is used according to an exemplary embodiment of the present principles for HDR reconstruction. The intuition of the graph-based HDRI method is twofold: on one hand, well-exposed pixels should be kept unchanged; on the other hand, because the luminance levels of different views vary due to vignetting, especially for LDR images obtained with a plenoptic camera, first pixels (badly exposed pixels) are reconstructed by copying the gradient information from its corresponding second pixels which are well-exposed in other LDR image(s).

As just discussed hereinabove, an HDR image 601 may be achieved by a graph-based method, which keeps well-exposed neighboring pixels unchanged while reconstructing first pixels (badly exposed pixels) by copying/mimicking the gradient information from corresponding pixels in other views via a graph smoothness prior. Specifically, for a target block Br (e.g. the first block 70) of size l×l centering at a first pixel p 700, having found n matched blocks $\{\tilde{B}_k^p\}_{k=1}^n$ of size l×l (e.g., l=13) by block matching, the dynamic range of p is extended by exploiting the structure (i.e., gradient) of $\{\tilde{B}_k^p\}_{k=1}^n$. This is achieved in two steps:

1) the common structure of $\{\tilde{B}_k^p\}_{k=1}^n$ is captured by constructing a graph from a representative version of $\{\tilde{B}_k^p\}_{k=1}^n$. The representative version could be i) a weighted average block of $\{\tilde{B}_k^p\}_{k=1}^n$; ii) a median block of $\{\tilde{B}_k^p\}_{k=1}^n$ or iii) one of $\{\tilde{B}_k^p\}_{k=1}^n$ that has the most similar pixel values in the well-exposed regions to the target block $B_t^p$ (measured in Euclidean distance). In one embodiment, the third version is selected here, which is denoted as z;

2) the structure of $B_t^p$ is forced to be the same with or similar to the common structure of $\{\tilde{B}_k^p\}_{k=1}^n$ while well-exposed pixels in $B_t^p$ remain the same, which is realized by an optimization regularized by a graph smoothness prior based on the previously constructed graph. The two steps are explained respectively below.

A graph is constructed from matched blocks $\{\tilde{B}_k^p\}_{k=1}^n$ to capture their common structure for the subsequent reconstruction. Specifically, a block z is chosen from $\{\tilde{B}_k^p\}_{k=1}^n$ first as the underlying signal, and a graph is then built on z.

There are different ways to construct the graph, such as the ε-neighborhood graph, k-nearest neighbor graph and the fully connected graph. While all these types may be used for different benefits, an 8-connectivity graph may be used for example for efficiency and simplicity. As shown in FIG. 7, in an 8-connectivity graph only pairwise adjacent pixels in the horizontal, vertical and diagonal directions are connected. An 8-connectivity graph is constructed on z by treating each pixel in z as a vertex and connecting adjacent pixels (i,j) as in FIG. 7. As mentioned before, the weight of each edge represents the similarity between adjacent pixel values: it is large when two pixels are similar and small otherwise. Specifically, the weight of an edge connecting pixel i and j is determined as:

$$w_{i,j} = e^{-\frac{\|z_i^p - z_j^p\|^2}{\sigma^2}}. \qquad (8)$$

where $\|z_i^p - z_j^p\|^2$ is the squared luminance difference in pixel i and j as a non-limitative example of measure of similarity. The parameter σ controls the sensitivity of the similarity measure to the range of the luminance difference, as each weight measures luminance similarity of neighboring pixels relative to the maximum luminance difference of neighboring pixels. It is empirically set to a scaler multiplied by the maximum luminance difference between neighboring pixels in the block, i.e., $$\sigma = a * \max_{i,j} |z_i^p - z_j^p|,$$

where a is empirically set in the range [0.1, 0.2].

With the constructed graph, the corresponding graph Laplacian L is calculated as defined before to form the graph smoothness prior for the reconstruction of badly exposed first pixels. The reconstruction is performed via optimization.

For a target LDR block $B_t^p$ centered at a badly exposed pixel p, or equivalently in a vector form $y_t \in \mathbb{R}^m$ for ease of mathematical description, the goal of the optimization is to find such an HDR block, represented in a vector form $x \in \mathbb{R}^m$, that 1) the luminance of well-exposed pixels in x are equivalent or quite similar to those in $y_t$, in order to keep the well-exposed pixels unchanged;
2) The luminance of badly exposed pixels in x is extended by a factor of r over the corresponding pixels in the matched block z; and
3) x is smooth with respect to the previously constructed graph from z so as to enforce the structure of x to be the same with or quite similar to the common structure of its matched block.

This leads to the following formulation of the objective function:

$$\min_x \|Hx - Hy_t\|_2^2 + \|\overline{H}x - r * \overline{H}z\|_2^2 + \beta x'Lx \qquad (9)$$

Minimizing the three terms in the objective function accomplishes the three aforementioned goals respectively. The first term is referred to as the data fidelity term, where H is an operator that extracts the well-exposed pixels from $y_t$ and x. Specifically, assuming the number of well-exposed pixels in x is m', H is a m'×m matrix, where $h_{i,j}=1$ if the jth pixel in x is well-exposed and $h_{i,j}=0$ otherwise. There is only one nonzero element in each row of H for picking one well-exposed pixel from x. The second term is to extend the luminance of badly exposed pixels, where $\bar{H}$ is a complementary operator of H for extracting the badly exposed pixels in x and z. Specifically, assuming the number of badly exposed pixels in x is m", $\bar{H}$ is a m"×m matrix, where $\bar{h}_{i,j}=1$ if the jth pixel in x is badly exposed and $\bar{h}_{i,j}=0$ otherwise. The third term is the graph smoothness prior to enforce x to have the common structure of its matched block represented by L. The scalar β>0 is a weighting parameter that strikes a balance between the former two terms and the graph smoothness prior. As (9) is a quadratic programming problem, it always admits the optimal solution. Further, it has a closed-form solution x* as follows:

$$x^* = (I_m + \beta L)^{-1} \begin{pmatrix} Hy_t \\ r*\bar{H}z \end{pmatrix}, \quad (10)$$

where $I_m$ is an identity matrix of size m×m. Hence, (9) can be efficiently solved via (10).

A graph-based reconstruction of badly exposed first pixels enables keeping their well-exposed neighboring pixels unchanged while recovering the first pixels by copying/mimicking the structure of their corresponding pixels which are well-exposed in other LDR images via a graph smoothness prior in the optimization. In this way, the method is robust even if the luminance levels of different LDR images are not the same due to inappropriate vignetting correction.

Figure 8:
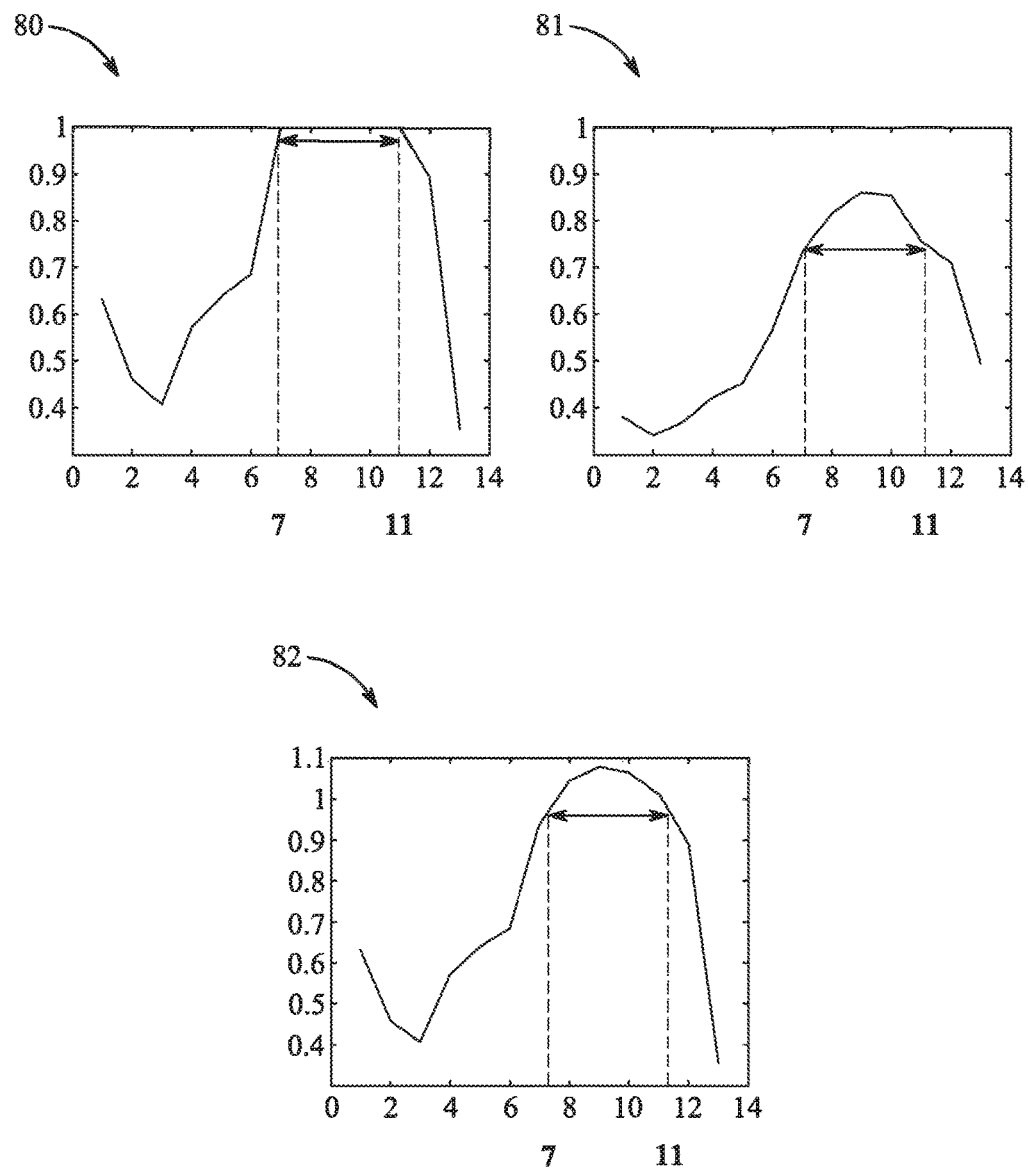
FIG. 8 shows graph signals associated with the blocks of pixels of FIG. 7, according to an embodiment of the present principles.

FIG. 8 shows graph signals associated with pixels of two LDR images to construct a HDR image, according to a non-limiting exemplary embodiment of the present principles. The graph signals 80, 81 and 82 are represented in a space with the x-axis corresponding to pixel index (from pixel index 0 to pixel index 14) and the y-axis corresponding to pixel value (e.g. luminance value or chrominance value). The graph signal x 80 shows the change of pixel values along a line segment in a first block of pixels of the first LDR image, some pixels of the block corresponding to first pixels, i.e. over-exposed pixels having pixel values greater than the first determined value (equal to 0.9 in the example of FIG. 8). Over-exposed first pixels are first pixels indexed 7, 8, 9, 10 and 11 according to this example. The graph signal y 81 shows the change 810 of pixel values along a line segment in a second block of pixels of a second LDR image, the second block corresponding to the first block (the first block corresponding for example to the block 70 and the second block to the block 71 of FIG. 7), the over-exposed first pixels of the first block having corresponding second pixels indexed 7 to 11 well-exposed in the second block, i.e. pixels values of the second pixels 7 to 11 being less than the first determined value and greater than the second determined value. The graph signal 82 shows the reconstructed signal from signal x 80 and signal y 81 using the graph-based technique described hereinabove. Pixel values of the over-exposed first pixels are reconstructed by copying/mimicking the gradients of the corresponding second pixels which are well-exposed in the second LDR image, which results in the reconstructed pixels shown at 82. This is achieved by deploying the graph smoothness prior as a regularizer in an optimization problem, which enforces the structure (i.e., gradient) of the desired reconstructed pixels x to be equivalent or quite similar to that of the corresponding well-exposed second pixels y in the second LDR image.

Figure 9:
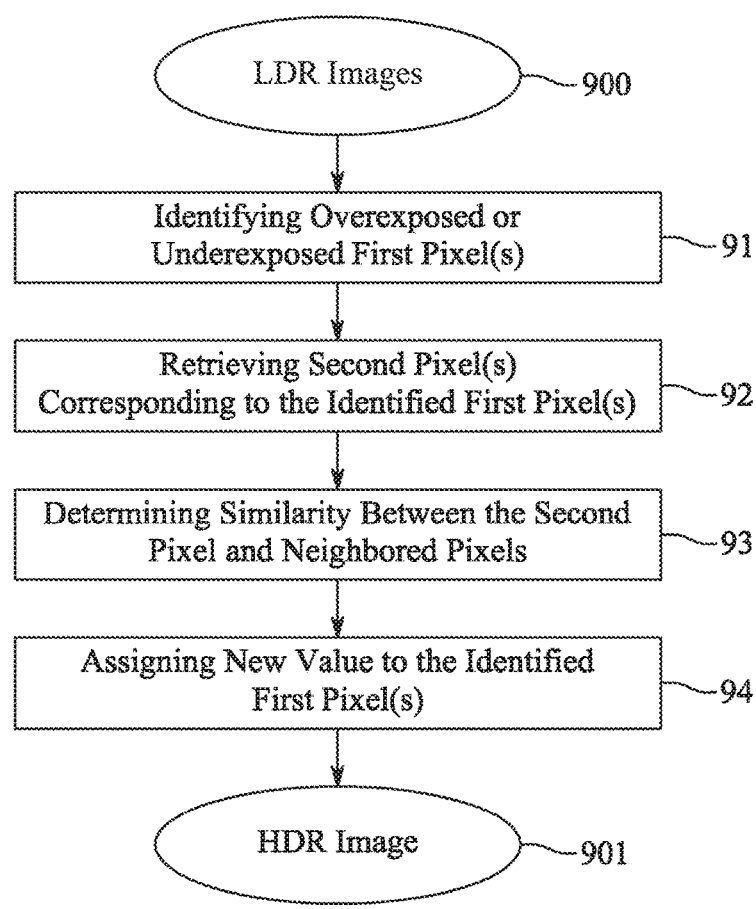
FIG. 9 is a flowchart depiction illustrating processing of LDR images of FIG. 4 to obtain a HDR image, according to an embodiment of the present principles.

FIG. 9 shows a flow chart depiction for obtaining a HDR image 901 from LDR images 900 that corresponds for example to the set 4 of images, as per one embodiment. In this embodiment, the data representative of the LDR images, i.e. pixel values of the pixels comprised in the LDR images, is received from an image acquisition device (e.g. a plenoptic camera), from a storage device or from a server located remotely, e.g. via the Internet.

In a step 91, one (or more) first pixel(s) is (are) identified in one or more of the LDR images, called first LDR images. For clarity reason, the following description is based on one first pixel of one first LDR image. It is naturally understood that the operations applied to this first pixel may be applied to several first pixels (or all first pixels) in one or several first LDR images. The first pixel is identified by comparing its associated pixel value with a range of values to check whether the first pixel value belongs to the range. The first pixel corresponds to an under-exposed pixel (i.e. a pixel having a pixel value greater than a first determined value) or to an over-exposed pixel (i.e. a pixel having a pixel value less than a second determined value). The aforementioned range of values contains values comprised between the first and second determined values. When the pixel value of a considered pixel of the first LDR image is in the range, the pixel is not identified as being a first pixel as said pixel is considered as being well-exposed. When the pixel value of a considered pixel of the first LDR image is out of the range, the pixel is identified as being a first pixel as said pixel is considered as being under-exposed or over-exposed.

In a step 92, one second pixel of a second LDR image of the plurality of LDR images is retrieved. The second pixel corresponds to the first pixel in the sense they both correspond or refer to the same 3D point of the scene. The second pixel is for example selected among a plurality of candidate second pixels identified in some or all of the LDR images of the plurality but not the first LDR image. A candidate second pixel is a pixel having a pixel value being within the range, i.e. a candidate second pixel is a well-exposed pixel that corresponds to the same 3D point. The selected second pixel is chosen as being the best match (i.e. the second pixel that best corresponds to the first pixel) among the candidate second pixels.

The second pixel is for example determined by applying a block matching process, i.e. by comparing a first block of pixels of the first LDR image (e.g. centred at the first pixel) with a plurality of blocks of pixels of some or all of the other LDR images (i.e. the LDR images different from the first LDR image). The mean pixel value of the candidate second blocks may for example be compared with the mean pixel value of the first block to determine which second block best matches the first block (the best match being the block having the closest mean pixel value than the mean pixel value of the first block).

According to a variant, the candidate second pixels corresponding to the first pixel may be determined by using disparity information associated with the pixels. The best second pixel may then be selected by comparing the mean pixel value associated with the blocks of pixels centered at the candidate second pixels with the mean pixel value of the first block.

In a step 93, weighting values representative of similarity between said second pixel and the other pixels of the second block of pixels centred at the second pixel are determined. A graph may be associated with the second block of pixels, as illustrated on FIG. 7 wherein the second block of pixels may correspond to the block 70. The second pixel 700 and its neighbouring pixels 711 to 718 surrounding it form the vertices of the graph and links between two adjacent pixels of the second block 71 form the edges of the graph (illustrated with straight lines). A weight value is associated with each edge. The weight value is representative of the similarity of two pixels linked by the edge the weight value is associated with. The weight value is for example calculated based on the pixel values associated with two pixels linked by the edge, e.g., by using the equation 8.

In a step 94, a new pixel value (called second pixel value) is calculated and assigned to the first pixel. The second pixel value is calculated based on one or more weight values calculated at step 93 and on pixel value(s) associated with pixels of the first block centered at the first pixel. A graph may be associated with the first block of pixels, as illustrated on FIG. 7 wherein the first block of pixels may correspond to the block 70. The second block 71 may be seen as the block best corresponding to the first block 70. The first pixel 700 then corresponds to the second pixel 710 and the pixels 701 to 708 correspond to the pixels 711 to 718. An edge of the graph 71 linking two adjacent pixels of the second block has a corresponding edge in the graph 70 linking the two pixels of the first block that correspond to said two adjacent pixels of the second block. The weight values associated with the edges of the second graph 71 are associated with corresponding edges of the first graph 70. To calculate the new value to be assigned to the first pixel, it is checked in the first block of pixels which pixels are well-exposed, i.e., which pixels have a pixel value comprised between the first and second determined values. One of the well-exposed pixels may be for example selected, e.g., the one linked with the first pixel via an edge having the greatest weight value. The new pixel value to be assigned to the first pixel may be obtained by weighting the pixel value of the selected well-exposed pixel. For example, if the selected pixel of the first block is the pixel 704 (with a pixel value of $PV_{704}$) and if the weight value (similarity) associated with the edge linking the pixel 704 with the first pixel 700 is 0.99 (similarity of 99%), the new pixel value $PV_{700}$ to be assigned to the first pixel is obtained by: $PV_{700}=0.99*PV_{704}$. According to another example, several well-exposed pixels are selected in the first block 70 to calculate the new pixel value to be assigned to the first pixel, the new pixel value being obtained as the weighted average of the pixel values of the selected well-exposed pixels based on the weight values associated with the edges linking the selected well-exposed pixels with the first pixel.

According to a variant, a further badly-exposed pixel of the first block different from the first pixel 700 may be assigned a new pixel value by applying the same operations. For example, if the further badly-exposed pixel is the pixel 702, its new pixel value $PV_{702}$ may be obtained by multiplying the new pixel value $PV_{700}$ of the first pixel 700 by the weight value associated with the edge linking these pixels 702 and 700. According to another example, the pixel value PV702 may be obtained by using the pixel value $PV_{701}$ of the pixel 701 (if the pixel 701 is a well-exposed pixel) and the weight value associated with the edge linking both pixels 701 and 702. According to a further example, the pixel value $PV_{702}$ may be obtained as the weighted average of several pixel values, for example $PV_{701}$ and $PV_{704}$ and $PV_{700}$.

By updating the pixel value of the first pixel with a second pixel value that is in the range of well-exposed, a HDR image may be obtained.

In an optional step, data representative of the HDR image are transmitted, e.g. to a HDR compatible display device.

In a further optional step, the HDR image is displayed on a HDR compatible display device.

According to an alternate embodiment, the amount of vignetting present in a plenoptic camera may be used to determine how much the dynamic range can be enhanced with the present principles. In other words, the amount of vignetting in a plenoptic camera determines an upper bound on any method's effectiveness to extract dynamic range from a plenoptic capture. For one specific camera, namely a Lytro, a uniformly illuminated white surface may be imaged, i.e., a white image. Luminance variations in such a white image are then mostly due to vignetting. By assessing this luminance variation, an upper bound on the amount of vignetting may be established. The extension factor of luminance range from vignetting in a plenoptic camera is tested by computing the ratio between the maximum and minimum luminance in each linearized micro-image in the corresponding white image. This ratio indicates the potential extension factor of luminance range of the embodiment.

Figure 10:
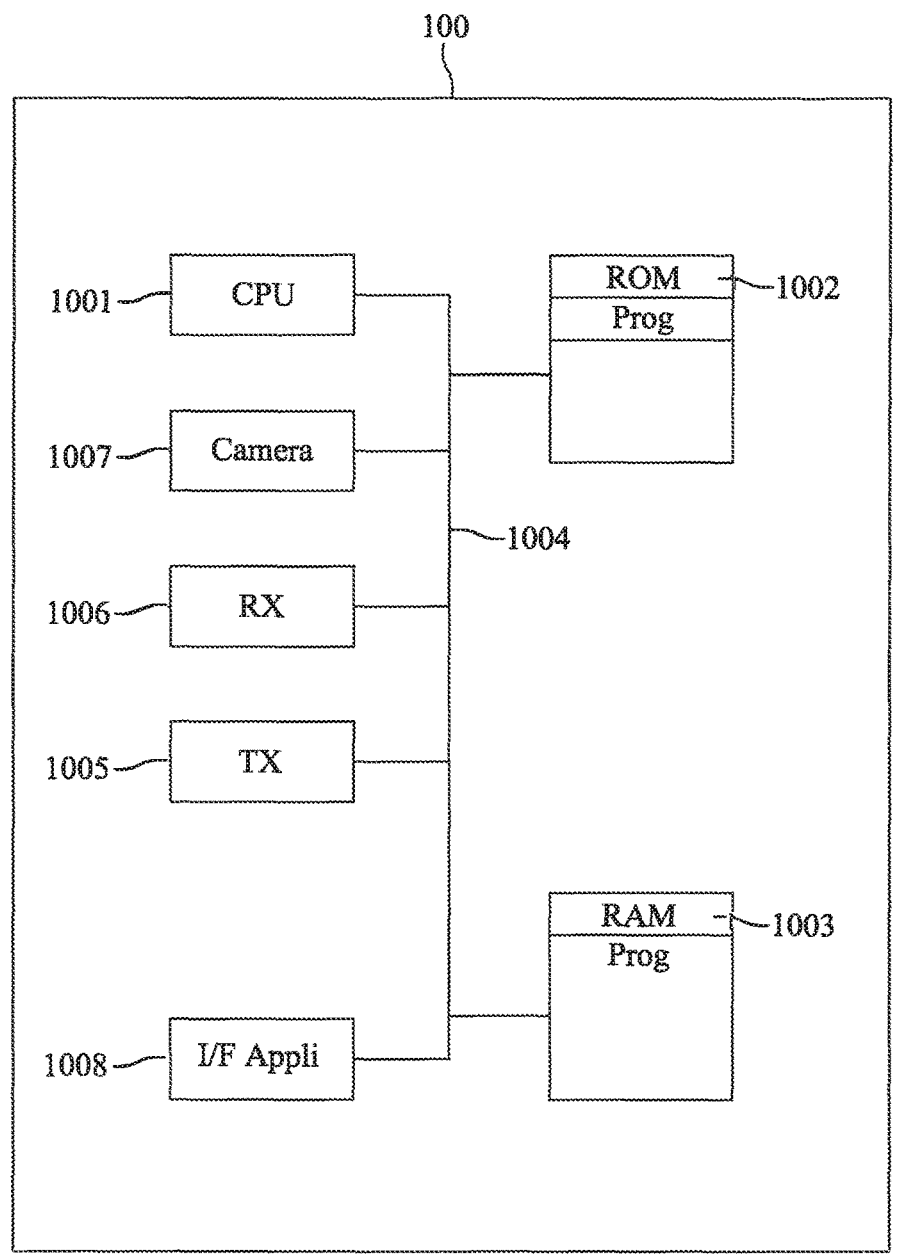
FIG. 10 is a block diagram illustration of an exemplary device depicting a telecommunication device used such as with processing flowchart depicted in FIG. 8 and/or FIG. 9, according to one embodiment of the present principles.

FIG. 10 diagrammatically illustrates a hardware embodiment of a telecommunication device 100, corresponding for example in one embodiment to a mobile device such as a smartphone, a tablet or other similar devices that embody a lightfield camera as per one embodiment.

In the embodiment provided by FIG. 10, a telecommunication device 100 is shown that comprises the following elements, connected to each other by a bus 1004 of addresses and data that also transports a clock signal:
- a microprocessor 1001 (or CPU),
- a non-volatile memory of ROM (Read Only Memory) type 1002,
- a Random Access Memory or RAM 1003,
- a radio interface 1006,
- an interface 1005 adapted for the transmission of data,
- a camera 1007, corresponding for example to the plenoptic camera 1 of FIG. 1 or to the multi-camera array 2 of FIG. 2,
- an MMI (Man Machine Interface) 1008 adapted for displaying information for a user and/or inputting data or parameters.

It is noted that the word "register" used in the description of memories 1002 and 1003 designates in each of the memories mentioned, a memory zone of low capacity as well as a memory zone of large capacity (enabling a whole program to be stored or all or part of the data representing data received and decoded).

The memory ROM 1002 comprises in particular a "prog" program.

The algorithms implementing the steps of the method specific to the present disclosure and described below are stored in the ROM 1002 memory associated with the telecommunication device 100 implementing these steps. When powered up, the microprocessor 1001 loads and runs the instructions of these algorithms.

The random access memory 1003 notably comprises:
- in a register, the operating programme of the microprocessor 1001 responsible for switching on the telecommunication device 100,
- reception parameters (for example parameters for modulation, encoding, MIMO, recurrence of frames),
- transmission parameters (for example parameters for modulation, encoding, MIMO, recurrence of frames),
- incoming data corresponding to the data received and decoded by the receiver 1006,
- decoded data formed to be transmitted at the interface to the application 1005,
- parameters of the camera,
- data representative of the LDR images,
- data representative of the HDR image.

Other structures of the telecommunication device 100 than those described with respect to FIG. 100 are compatible with the present disclosure. In particular, according to variants, the telecommunication device may be implemented according to a purely hardware realization, for example in the form of a dedicated component (for example in an ASIC (Application Specific Integrated Circuit) or FPGA (Field-Programmable Gate Array) or VLSI (Very Large Scale Integration) or of several electronic components embedded in an apparatus or even in a form of a mix of hardware elements and software elements.

The radio interface 1006 and the interface 1005 are for example adapted for the reception and transmission of signals according to one or several telecommunication standards such as IEEE 802.11 (Wi-Fi), standards compliant with the IMT-2000 specifications (also called 3G), with 3GPP LTE (also called 4G), IEEE 802.15.1 (also called Bluetooth) . . . .

In an alternate embodiment, the telecommunication device does not include any ROM but only RAM, the algorithms implementing the steps of the method specific to the present disclosure and described with regard to figure being stored in the RAM. According to another variant, the telecommunication device 100 comprises a SSD (Solid-State Drive) memory instead of the ROM and/or the RAM.

Naturally, the present disclosure is not limited to the embodiments previously described.

In particular, the present disclosure is not limited to an apparatus configured to process lightfield data or to a method of processing lightfield data but also extends to a method/apparatus for displaying the representation of the lightfield data and/or to reconstruct one or more views of the scene or part of the scene, for example background part of the scene by removing foreground objects and by using the information relative to the groups of rays and/or the depth information stored in the depth map or to any device comprising such an apparatus or implementing such method(s), for example a telecommunication device.

Telecommunication devices includes, for example, smartphones, smartwatches, tablets, computers, mobile phones, portable/personal digital assistants ("PDAs"), see-through glasses, Head-Mounted Display (HMD) and other devices that facilitate communication of information between end-users but also set-top-boxes.

The method of obtaining a depth map described herein may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of obtaining a first image representative of a scene, the first image having a first dynamic range, the method comprising:
  obtaining a plurality of second images representative of said scene, the second images having a second dynamic range that is lower than the first dynamic range;
  for a second image of said plurality of second images, identifying at least one first pixel of a first block of pixels having a first pixel value greater than a first threshold value or less than a second threshold value;
  retrieving a second pixel in another second image of said plurality of second images corresponding to said at least one first pixel;
  in a second block of pixels comprising said second pixel, determining weighting values representative of similarity between said second pixel and the other pixels of said second block; and
  obtaining said first image by assigning a second pixel value to said at least one first pixel, the second pixel value being obtained from said weighting values and first values associated with pixels of said first block of pixels.

2. The method according to claim 1, wherein said weighting values are obtained by comparing pixel values of pixels of said second block, a weighting value being associated with an edge linking two pixels of the second block.

3. The method according to claim 2, wherein said second pixel value is obtained by:
  selecting within the first block at least one pixel having an associated first value being in a range between said first threshold value and said second threshold value, said at least one pixel being adjacent to said at least one first pixel within the first block; and
  weighting the first value of said at least one selected pixel with the weighting value associated with the edge linking at least one pixel of the second block corresponding to the at least one selected pixel of the first block with said second pixel.

4. The method according to claim 1, wherein said second pixel is retrieved by:

comparing said first block with a plurality of blocks of pixels in the plurality of second images different from said second image used for identifying said at least one first pixel of the first block of pixels;

selecting said second block of pixels among the plurality of blocks of pixels compared with said first block, the selected second block of pixels being the block of pixels having a smallest distance from said first block;

retrieving said second pixel from said selected second block.

5. The method according to claim 1, wherein said plurality of second images is obtained from lightfield data obtained with a plenoptic camera.

6. A device for obtaining a first image representative of a scene, the first image having a first dynamic range, the device comprising a memory associated with at least one processor configured to:

obtain a plurality of second images representative of said scene, the second images having a second dynamic range that is lower than the first dynamic range;

for a second image of said plurality of second images, identify at least one first pixel of a first block of pixels having a first pixel value greater than a first threshold value or less than a second threshold value;

retrieve a second pixel in another second image of said plurality of second images corresponding to said at least one first pixel;

in a second block of pixels comprising said second pixel, determine weighting values representative of similarity between said second pixel and the other pixels of said second block; and obtain said first image by assigning a second pixel value to said at least one first pixel, the second pixel value being obtained from said weighting values and first values associated with pixels of said first block of pixels.

7. The device according to claim 6, wherein said at least one processor is further configured to obtain said weighting values by comparing pixel values of pixels of said second block, a weighting value being associated with an edge linking two pixels of the second block.

8. The device according to claim 7, wherein said at least one processor is further configured to obtain said second pixel value by:

selecting within the first block at least one pixel having an associated first value being in a range between said first threshold value and said second threshold value, said at least one pixel being adjacent to said at least one first pixel within the first block; and weighting the first value of said at least one selected pixel with the weighting value associated with the edge linking at least one pixel of the second block corresponding to the at least one selected pixel of the first block with said second pixel.

9. The device according to claim 6, wherein said at least one processor is further configured to retrieve said second pixel by:

compare said first block with a plurality of blocks of pixels in the plurality of second images different from said second image used for identifying said at least one first pixel of the first block of pixels;

select said second block of pixels among the plurality of blocks of pixels compared with said first block, the selected second block of pixel being the block of pixel having a smallest distance from said first block;

retrieve said second pixel from said selected second block.

10. The device according to claim 6, wherein said plurality of second images is obtained from lightfield data obtained with a plenoptic camera.

11. A multimedia terminal comprising an image acquisition device configured to obtain a plurality of low dynamic range images, the multimedia terminal further comprising a device for obtaining a first image representative of a scene, the first image having a first dynamic range, the device comprising a memory associated with at least one processor configured to:

obtain a plurality of second images representative of said scene, the second images having a second dynamic range that is lower than the first dynamic range;

for a second image of said plurality of second images, identify at least one first pixel of a first block of pixels having a first pixel value greater than a first threshold value or less than a second threshold value;

retrieve a second pixel in another second image of said plurality of second images corresponding to said at least one first pixel;

in a second block of pixels comprising said second pixel, determine weighting values representative of similarity between said second pixel and the other pixels of said second block; and obtain said first image by assigning a second pixel value to said at least one first pixel, the second pixel value being obtained from said weighting values and first values associated with pixels of said first block of pixels.

12. The multimedia terminal according to claim 11, wherein said image acquisition device is a plenoptic camera.

13. A non-transitory processor readable medium having stored therein instructions for causing a processor to perform the operations of a method of obtaining a first image representative of a scene, the first image having a first dynamic range, the method comprising:

obtaining a plurality of second images representative of said scene, the second images having a second dynamic range that is lower than the first dynamic range;

for a second image of said plurality of second images, identifying at least one first pixel of a first block of pixels having a first pixel value greater than a first threshold value or less than a second threshold value;

retrieving a second pixel in another second image of said plurality of second images corresponding to said at least one first pixel;

in a second block of pixels comprising said second pixel, determining weighting values representative of similarity between said second pixel and the other pixels of said second block; and obtaining said first image by assigning a second pixel value to said at least one first pixel, the second pixel value being obtained from said weighting values and first values associated with pixels of said first block of pixels.

* * * * *